Nov. 12, 1957 N. V. S. KNIBBS ET AL 2,812,592
HEAT TREATMENT OF FINELY-DIVIDED SOLIDS
Filed Nov. 14, 1955 4 Sheets-Sheet 1

Inventors
Norman Victor Sydney Knibbs
Edward George Stanley Thyer
by Stevens, Davis, Miller & Mosher
their attorneys

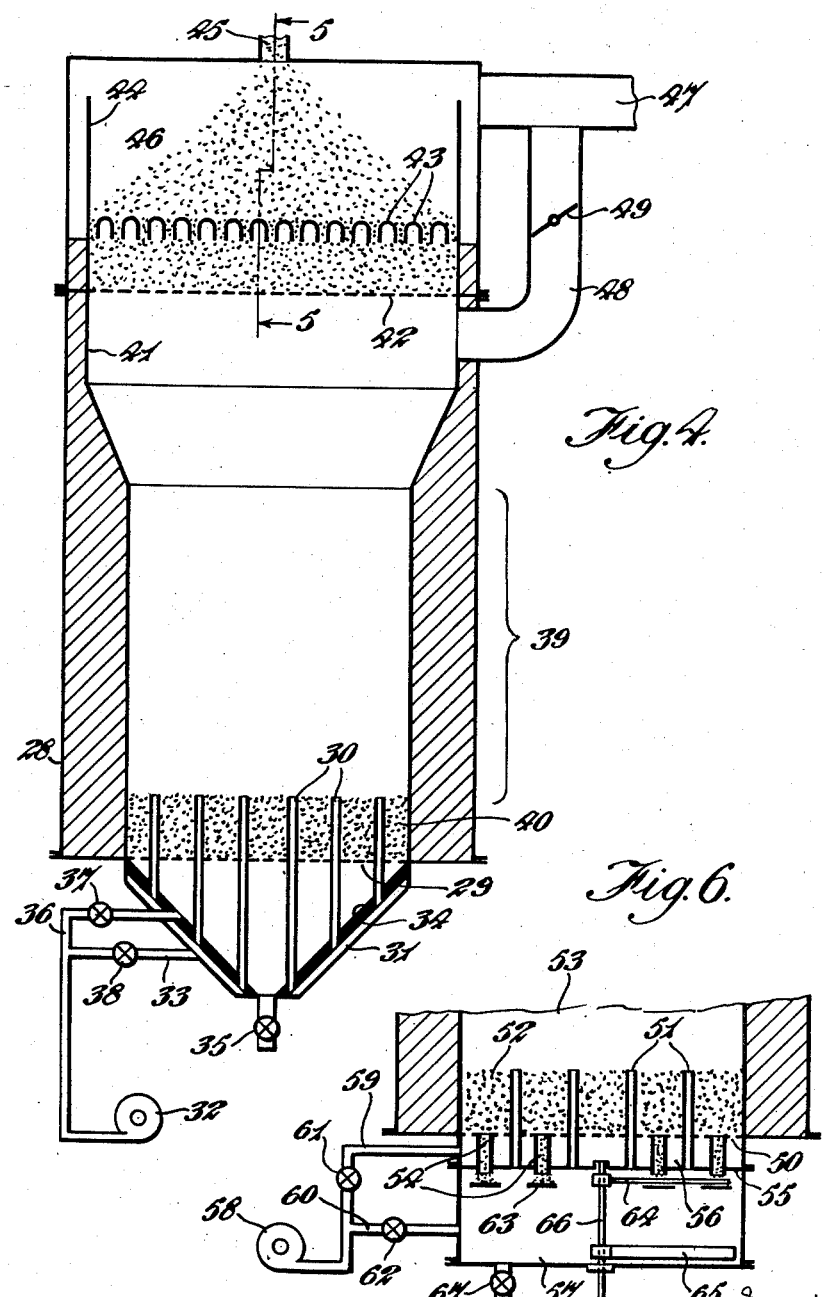

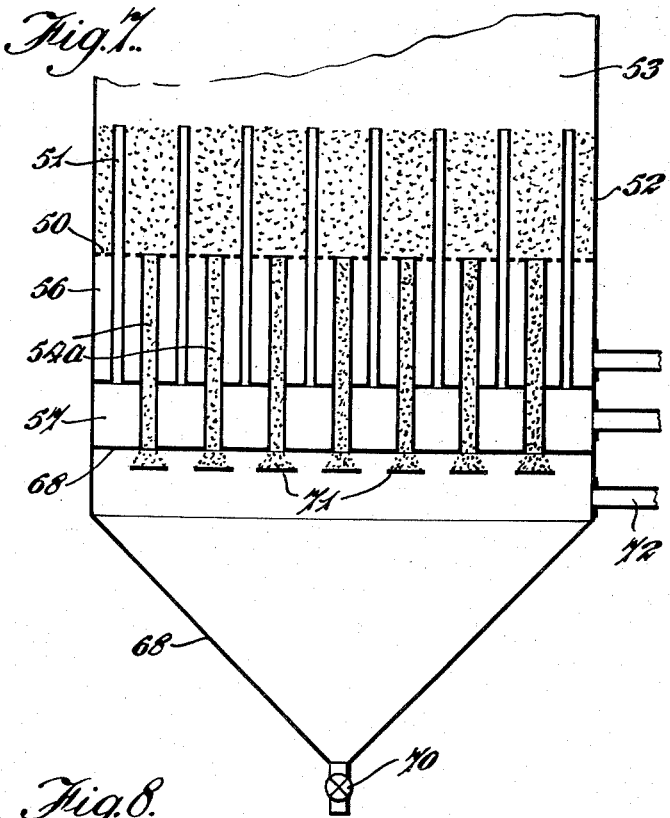
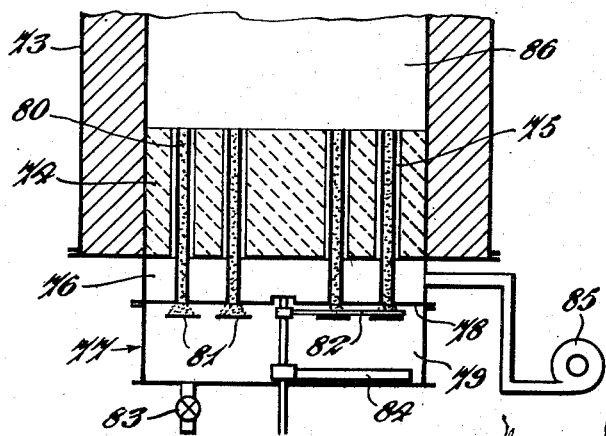

United States Patent Office

2,812,592
Patented Nov. 12, 1957

2,812,592

HEAT TREATMENT OF FINELY-DIVIDED SOLIDS

Norman Victor Sydney Knibbs, Longfield, and Edward George Stanley Thyer, Sanderstead, England, assignors to Fawkham Developments Limited, London, England Application November 14, 1955, Serial No. 546,687

Claims priority, application Great Britain December 9, 1954

3 Claims. (Cl. 34—57)

This invention relates to the heat treatment of finely divided solids and more particularly to methods of and apparatus for the heat treatment, including calcination, oxidation, reduction and drying, of such solids.

The principle known as the fluidized or boiling bed in which solid particles are maintained in a state of turbulence by the upward passage of gas through the bed of solid has been employed in such heat treatment. For example, small limestone from about one quarter inch downwards has been calcined in a fluidized bed, the fuel for calcination being burnt in the fluidized bed of calcining material. The rate of heat exchange is very high in the fluidized bed so that the calcining operation is of high efficiency, but the overall thermal efficiency is low unless the heat in the hot gases leaving the calcining bed and in the hot calcined material is utilized. In lime burning, for example, the temperature of both the hot gases leaving the bed and of the hot calcined material is close to 900° C.

The heat may be partially recovered by having a number of fluidized beds in series. Thus a kiln has been proposed consisting of a number of fluidized beds one above the other, the solid flowing through each bed to the one below and the air or gases passing upwardly through each bed in counter flow. The extent of the utilization of the heat then depends on the number of beds employed. In lime burning for example, it has been proposed to use five beds, three above the calcining bed and one below it. There are, however, several disadvantages arising from these additional beds; they complicate the apparatus, making it less accessible for repairs and they considerably increase the power required for the supply of air. Furthermore the dust from some materials tends to adhere to the sides of the perforations in the beds above the calcining bed, and to restrict these perforations, a difficulty that has been encountered in lime burning, and dust formation is increased by the plurality of beds because of the abrasion which occurs in each of them. The system of overflowing from one bed to another through tubular passages through the beds which is a feature of the fluo-solid furnace with more than one bed is also liable to give trouble.

In British patent specification No. 666,172, there is described an apparatus for heat treatment of finely divided solids comprising an upright kiln having a perforated support for a fluidized bed in the lower half thereof, in which the incoming solid material is distributed in a shower as it passes downwardly through the preheating zone of the kiln in countercurrent to the hot gases arising from the fluidized bed.

One of the objects of the present invention is to provide an improved method of utilizing the heat from the hot gases rising from the fluidized bed and/or the heat retained in the solid after leaving the fluidized bed. Another object is to provide improved apparatus for the purpose set forth.

Experiment has shown that when heating or cooling finely divided solids of the size or grading used in a fluidized bed, very good heat exchange can be obtained in a small depth of the material even of only a few inches so long as the air or gases pass evenly through the said material and the solids in the bed itself move substantially evenly down counter to the gas flow and discharge substantially evenly over the whole area.

In the heat treatment of finely divided solids, the present invention, according to one aspect thereof, consists in the method of utilizing heat generated in a fluidized bed of the solid for preheating the said solid and/or the air or gases supplied to maintain the bed in the fluidized condition, wherein the said air or gases are caused or flow through a zone below and/or a zone above the fluidized bed in which there is maintained a substantially static or slow moving layer or columns of the solid, so as to effect heat exchange between the air or gases and the solid in the substantially static or slow moving layer or columns.

Further, according to the invention, in apparatus for the heat treatment of finely divided solids, air or gases flowing upwardly through the apparatus to maintain a fluidized bed of solid material therein are caused to flow through a zone above and/or a zone below the fluidized bed in which there is maintained a substantially static layer or columns of the solid, so as to effect heat exchange between the air or gases and the solids forming the said substantially static layer or columns.

The accompanying drawings, which are of a diagrammatic nature, show a number of embodiments of apparatus according to the invention.

In the drawings:

Figure 4 is a sectional elevation of another form of kiln embodying the invention;

Figures 6, 7 and 8 are sectional elevations of the lower portions of other forms of kiln embodying the invention.

Figure 1:
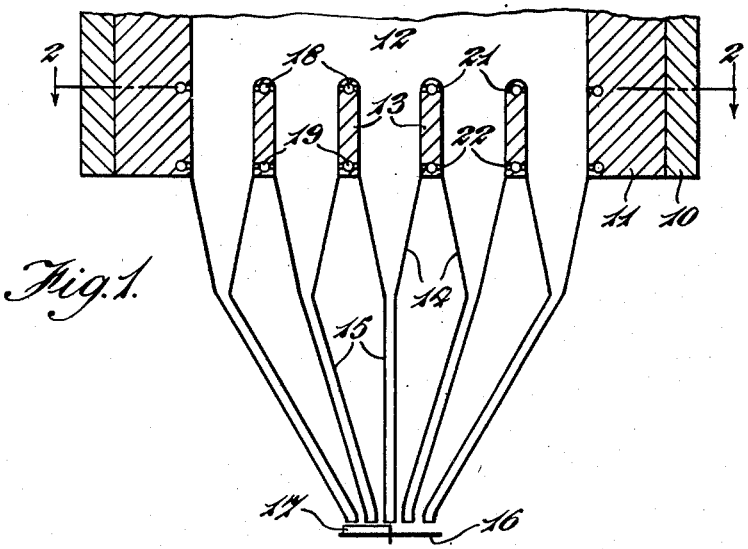
Figure 1 is a sectional elevation of the lower portion of a kiln embodying the invention.
Figure 2:
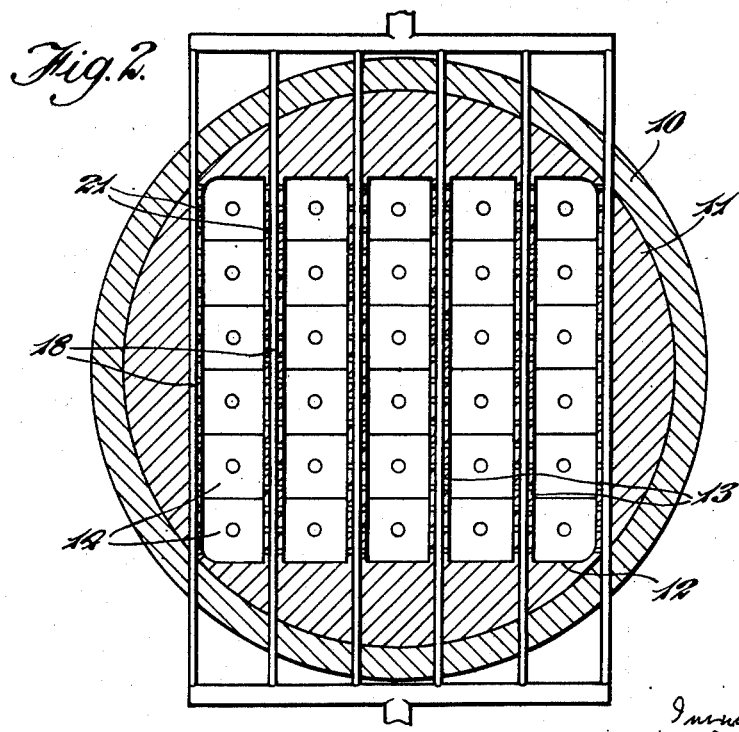
Figure 2 is a sectional plan view of the kiln shown in Figure 1, the section being taken on the line 2—2 of Figure 1.

Referring to Figures 1 and 2 of the drawings, a vertical kiln for calcining solid material comprises an externally cylindrical shell 10 with a lining of refractory material 11 defining an internal cavity 1₂ of rectangular cross-section. At the lower end, the kiln is divided by a plurality of vertical partition walls 13, preferably equally spaced, into a number of rectangular sections each extending across the full width of the kiln. For example, a kiln of square section having its sides six feet long may be divided by four partition walls 13, each three inches thick, into five sections each six feet long by one foot wide.

The kiln is supported on a suitable framework (not shown) which also carries a plurality of inverted pyramidal hoppers 14, each having a base the sides of which are equal in length to the width of the sections between the partition walls 13, a row of such hoppers 14 being provided below each section so as completely to occupy the space below that section, the hoppers being joined to the outer walls of the kiln, to the partition walls 13, and to each other, so as to make airtight joints. The depth of the hoppers 14 is of the order of twice the length of a side of their bases, and each hopper terminates at its lower end in a round or square opening leading into a discharge tube 15 of small cross-section compared with the base of the hopper. For example, with hoppers having bases one foot square, such as would be employed with a kiln of the dimensions above mentioned, the discharge tubes might be round and of one and a quarter inches diameter. Flow of solid material downwardly through the discharge tubes may be regulated in any convenient manner, for example by providing a circular table 16 spaced a short distance below the lower ends of the tubes, and a plough or scraper 17 revolving over the surface of the table to sweep off the material falling thereon from the tubes.

The height of the partition walls 13 is somewhat greater than the distance between them, for example one and one half times the said distance, and two horizontal ducts 18 and 19 are provided in each wall, the duct 18 being adjacent the upper edge of the wall and the duct 19 adjacent the lower edge of the wall. Corresponding ducts 18 and 19 are provided in the side walls of the kiln parallel to the partition walls 13, all of the ducts extending right across the kiln. Lateral holes 21 and 22 in the partition walls 13 and in the side walls of the kiln connect the ducts 18 and 19 respectively to the spaces between the walls 13, and the ducts 18 are all connected to one common air supply source, whilst the ducts 19 are all connected to another common air supply source. Solid or liquid fuel used to supply heat is introduced or injected in any convenient manner above the holes 21 leading from the ducts 18. Alternatively, gaseous fuel or hot gas may be introduced through some of all of the ducts 18 or through additional ducts connected to holes interspersed between the holes 21.

It has been found that when finely divided solids, for example material within the range of 5 mesh to 52 mesh B. S. S. sieves (or any similar range), is contained in a receptacle of square or substantially square cross-section, which has vertical walls in its upper part and, below the vertical walls, a part of progressively downwardly decreasing cross-section terminating in a small opening, discharge of the solid material through the said opening will be accompanied by a downward movement of the material in the vertical-walled part of the receptacle which is substantially even over the whole area of the receptacle, provided that the depth of the material within the vertical walls is at least equal to the length of the side of the square, and the taper of the lower part of the receptacle is sufficiently small, the maximum angle of taper which has been found satisfactory being of the order of 15°.

The same effect is obtained with receptacles of round or other cross-section, and also with a receptacle of elongated rectangular cross-section having a plurality of lower parts of tapering cross-section arranged side-by-side along its length. As each of the sections between the walls 13 of the kiln shown in Figures 1 and 2 corresponds to a receptacle of elongated rectangular cross-section, even downward movement is obtained of solid material forming a bed or layer in the bottom of the kiln.

It has also been found that when air or another gas is blown horizontally into a bed of finely divided solids through small openings, so that the velocity of entry of the gas is high, it spreads outwards across the bed and the flow of air or gas is approximately even over the whole area of the bed provided that the spacing of the openings, the horizontal distance which the gas has to penetrate, and the vertical distance between the gas inlets and the top of the bed, are suitably chosen. An example of suitable dimensions is provided by the construction described with reference to Figures 1 and 2, the height and spacing of the partition walls 13 being as already stated, the vertical distance between the holes 21 and 22 being about fifteen inches and the diameter of the holes being about three-eighths of an inch. The holes 21 and 22 are spaced at intervals of about three inches.

When the kiln or furnace is in use, the finely-divided solid material to be heated or calcined is fed downwardly into it to maintain a bed extending some distance above the upper edges of the partitions 13, the rate of feed being correlated with the rate of discharge of burnt lime through the tubes 15. Air supplied under pressure to the ducts 19 passes out through the holes 22 and upwardly through the bed of solid material. Further air supplied under pressure to the ducts 18 passes out through the holes 21 and upwardly through the solid material above the partition walls 13. The total quantity of air supplied through both sets of ducts is sufficient to produce fluidization of the solid material above the partition walls 13, but the quantity of air supplied through the ducts 19 is insufficient to fluidize it. Fuel for combustion is introduced into the kiln in any suitable manner, preferably at a number of points at or near the bottom of the fluidized bed. A preheating zone for the solid material may be provided above the fluidized bed, for example in the manner described with reference to Figure 4 of the accompanying drawings.

The arrangement described with reference to Figures 1 and 2 may be used in a drier, comprising a steel vessel at the lower end of which the partition walls and hoppers are provided, the upper end being open to the atmosphere or enclosed and connected to a cyclone or other form of dust separator to recover the dust carried upwardly by the air or gas. The upper ducts 18 are supplied with the products of combustion from or with air heated by a furnace. Cold air is blown through the lower ducts 19 in sufficient quantity to cool the solid material between the partitions 13 without producing fluidization thereof, whereas the total quantity of air introduced through both sets of ducts produces fluidization above the partitions.

Figure 3:
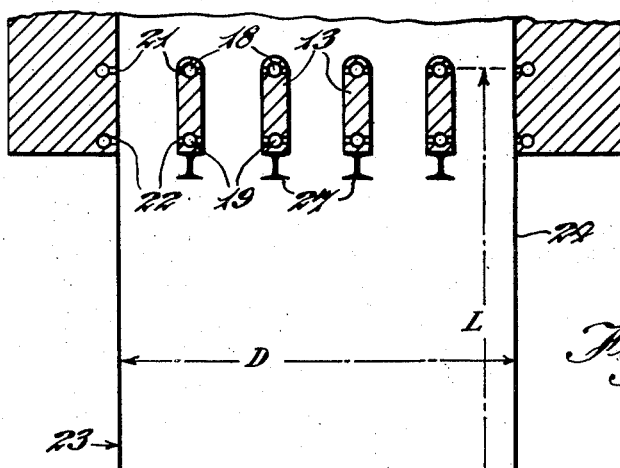
Figure 3 is a sectional elevation similar to Figure 1 showing a modified hopper arrangement.

Figure 3 shows a modification of the construction shown in Figure 1, in which the hoppers 14 are replaced by a single hopper 23 having an upper portion 24 of the same shape and cross-sectional area as the interior of the kiln itself, and a lower portion 25 which tapers downwardly to an outlet controlled by a valve 26 or by other suitable means. Partitions 13 as shown in Figure 1 are supported in any convenient manner, as, for example, by the I section girders 27, ducts 18, 19 and holes 21, 22 being provided as described with reference to Figure 1.

In order that substantially even downward movement of the solid material may take place, the vertical distance L from the upper edges of the partitions 13 to the lower end of the portion 24 of the hopper is made greater than the maximum transverse dimension D of that portion of the hopper, and the angle of slope of the sides of the portion 25 of the hopper is made not greater than 15° to the vertical.

Figure 4 of the drawings shows a vertical furnace or kiln for heating or calcining solid material, the kiln 28 being provided with a perforated plate 29 at its lower end, and with a plurality of vertical supply tubes 30 passing upwardly through the plate 29, all of the tubes 30 having their upper ends in a common horizontal plane some distance above the plate. The lower ends of the tubes 30 are connected to a manifold 31 into which air or gas is supplied by a blower 32 through a pipe 33. A hopper 34 is provided below the plate 29, the hopper being closed and having a discharge valve 35 at its lower end. A branch pipe 36 leads from the pipe 33 into the hopper 34, and valves 37 and 38 in the pipes 36 and 33 respectively enable the air or gas to be distributed between the manifold 31 and the hopper 34 in selected proportions.

The holes in the perforated plate 29 are large compared with the maximum particle size of the material being treated, the holes, for example, being three-quarters of an inch in diameter when the material has a maximum particle size of three-sixteenths of an inch.

The total flow of air or gas from the blower 32 is sufficient to maintain solid material in the zone 39 of the kiln above the upper ends of the tubes 30 as a true fluidized bed, but the proportion flowing through the holes in the perforated plate 29 is normally maintained at a value sufficient only just to support the solid material between the plate 29 and the upper ends of the tubes 30. Thus solid material in the kiln forms a static bed 40 extending upwardly from the perforated plate 29 to the upper ends of the tubes 30, and a fluidized bed extending upwardly from the upper ends of the tubes 30, in the zone 39. Good heat exchange is thus obtained in the bed 40, the calcined solid being cooled and the heat lost by it being absorbed by the air or gas introduced through the perforated plate. Periodic downflow of material at a desired average rate is obtained by periodically cutting off the flow of air or gas through the perforated plate 29, by means of the valve 37, and thus allowing the material to fall through the holes in the plate into the hopper, from which it is removed through the discharge valve 35.

Figure 5:
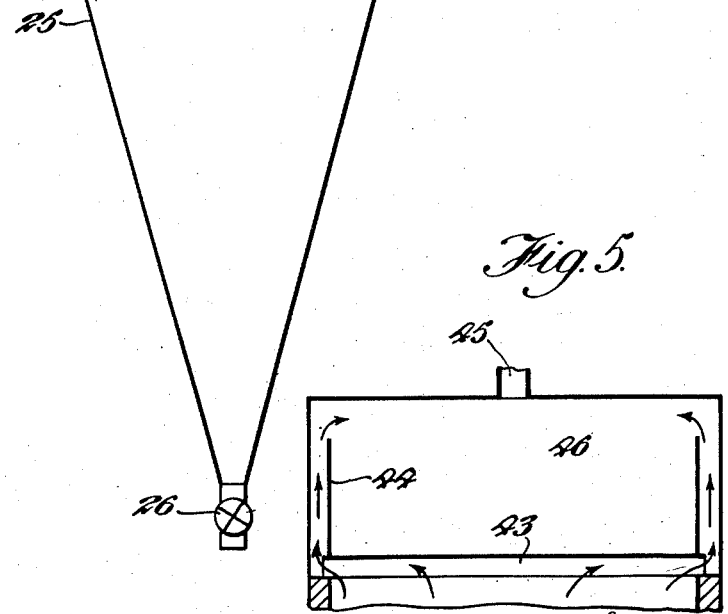
Figure 5 is a sectional elevation of the upper part of the kiln shown in Figure 4, taken on the line 5—5 of Figure 4.

Preheating of the solid material entering the kiln 28 may be carried out at the top of the kiln, the upper part 41 of which is enlarged to about double the area of the fluidized bed. A perforated plate 42 or other similar support is provided in the enlarged portion of the kiln, having holes which are large as compared with the particle size of the solid material. Above the perforated plate 42 there is provided a grid or grating 43 consisting of a plurality of bars of inverted U-shape having their ends passing, as shown in Figure 5, through an internal wall 44 spaced from the outer wall of the kiln, so that the air or gases passing upwardly through the plate 42 can flow laterally along the channels in the undersides of the bars into the space between the inner and outer walls. Solid material is fed into the top of the kiln through an opening 45 and forms a cone above the grating 43, leaving an empty space 46 into which the air or gases flow from the space between the walls.

An exhaust pipe for the gases rising from the fluidized bed is provided at 47, above the grating 43, and a by-pass 48, in which is a valve 49, leads from below the perforated plate 42 into the exhaust pipe.

The valve 49 is normally closed or set so that the proportion of the gases flowing upwardly through the perforated plate 42 is just sufficient to support the solid material above the said plate. The valve 49 is opened from time to time to reduce the flow of gases through the plate 42 and so allow solid material to fall through the holes therein.

Instead of providing a by-pass 48 controlled by a valve 49, the zone above the plate 42 may be divided by vertical partitions into two or more sections, the escape of air or gas from each section in turn being obstructed, thus reducing the flow through the plate 42 into that section and allowing solid material to fall therefrom.

In the kiln shown in Figure 6, a perforated plate 50, similar to the plate 29, of Figure 4, is provided at the bottom of the kiln, and tubes 51, similar to the tubes 30, pass upwardly through the plate 50, air or gas being fed through the holes in the plate 50, and through the tubes 51, so as to maintain a substantially static bed 52 below a fluidized bed 53 of solid material as already described. Discharge tubes 54 are provided which extend downwardly from openings in the plate 50 and through a horizontal partition 55 which divides a closed chamber below the plate 50 into upper and lower compartments 56 and 57. The tubes 51 open at their lower ends into the compartment 57, and air or gas supplied by a blower 58 is delivered, through pipes 59 and 60 respectively into the compartments 56 and 57, the pipes 59 and 60 being provided with valves 61 and 62 respectively for controlling the relative flow of air or gases therein. The discharge tubes 54 terminate a short distance above plates 63 in the compartment 57, the plates 63 being of sufficient size to prevent the free discharge of material from the tubes, and a rotating arm 64 is provided which sweeps the material from each plate in turn, thus allowing discharge of material at a rate depending on the speed of rotation of the arm. Alternatively, the plates 63 may be vibrated to shake the solid material off them. The solid material swept from the plates 63 falls into the bottom of the compartment 57, and is swept by a plough 65, conveniently carried by the same shaft 66 as the arm 64, to an outlet valve 67.

The kiln shown in Figure 7 is generally similar to that shown in Figure 6, but the tubes 54a, through which the solid material is discharged, extend downwardly through a further partition 68 forming the bottom of the compartment 57, into a hopper 69 from which the said material is removed through a discharge valve 70. Below the open lower end of each discharge tube is a circular plate or disc 71 of such a size that it does not prevent downward flow of solid material through the tube unless there is an upward current of air or gas through the tubes partially to support the material therein. Air or gas is normally supplied to the hopper 69 to maintain such a current through an inlet 72, but the flow through the inlet 72 is reduced at intervals, for short periods, thus allowing the solid material to flow downwardly through the tubes 54a. Air or gas is supplied to the upper and lower compartments 56 and 57 as previously described.

The invention is not confined to the use of a substantially static layer of solid material through which the air or gases pass to provide the heat-exchange between the said air or gases and the solid material. Figure 8 shows an arrangement in which there is provided, in the bottom of a kiln 73, a block 74 of refractory material having vertical passages 75 therethrough, leading downwardly into the upper compartment 76 of a closed chamber 77, which compartment 76 is separated by a horizontal partition 78 from a lower compartment 79. Tubes 80 mounted concentrically in the passages 75 extend downwardly through the partition 78. Below each tube 80 there is mounted a fixed plate 81 large enough to prevent the free flow of solid material through the tube, and an arm 82 sweeps over the plates to remove material therefrom and control the rate of discharge. An outlet valve 83 is provided in the bottom of the compartment 79, and a plough 84 sweeps the material falling from the plates 81 towards the said outlet valve.

Air is supplied to the compartment 76 by a blower 85, and passes upwardly through the annular passages 75 to maintain a fluidized bed 86 of solid material above the block 74. This air passes in countercurrent to the solid material moving downwardly in the tubes 80, and thus takes up heat therefrom.

While the illustrated embodiments of the invention have been referred to as kilns for calcining various solids, it will be understood that the constructions described may be utilized for drying purposes.

We claim:

1. In apparatus for the heat treatment of finely divided solids including a treatment chamber in which the solid is subjected to heating while being maintained as a fluidized bed, the provision of vertical walls dividing the lower part of the chamber into a plurality of sections, hopper means extending downwardly from the bottom of said chamber, a first series of ducts in said vertical walls, outlet holes adjacent the upper edges of said walls and connected to said first series of ducts, a second series of ducts in said vertical walls, outlet holes adjacent the lower edges of said walls and connected to said second series of ducts, means for supplying a gaseous medium to both said series of ducts so as to produce a total upward current of gaseous medium sufficient to maintain the fluidized bed above the vertical walls and a lesser upward current of gaseous medium between the walls insufficient to produce fluidization of solid material between said walls, and means for controlling downward movement of solid material in said hopper means whereby the gaseous medium and solid move in countercurrent between said vertical walls and heat exchange takes place between them.

2. In apparatus for the heat treatment of finely divided solids including a treatment chamber in which the solid is subjected to heating while being maintained as a fluidized bed, the provision of a treatment chamber having at least its lower portion of rectangular cross section, a plurality of equally spaced parallel vertical walls in said lower portion dividing said lower portion into a plurality of elongated sections, a row of rectangular hoppers disposed below each of said sections, a first series of ducts in said vertical walls, outlet holes adjacent the upper edges of said walls and connected to said first series of ducts, a second series of ducts in said vertical walls, outlet holes adjacent the lower edges of said walls and connected to said second series of ducts, means for supplying a gaseous medium to both said series of ducts so as to produce a total upward current of gaseous medium sufficient to maintain the fluidized bed above the vertical walls and a lesser upward current of gaseous medium between the walls insufficient to produce fluidization of solid material between said walls, and means for controlling downward movement of solid material in said hoppers whereby the gaseous medium and solid material move in countercurrent between said vertical walls and heat exchange takes place between them.

3. In apparatus for the heat treatment of finely divided solids including a treatment chamber in which the solid is subjected to heating while being maintained as a fluidized bed, the provision of a treatment chamber having at least its lower portion of rectangular cross section, a plurality of equally spaced parallel vertical walls in said lower portion dividing said lower portion into a plurality of elongated sections, a hopper extending downwardly from the bottom of said chamber and including a parallel-sided upper portion of the same cross-sectional area as the lower portion of the treatment chamber and a lower portion tapering downwardly to an outlet, said parallel sided upper portion being of such a length that the distance from the upper edges of the vertical walls to the lower end of said portion is greater than the maximum transverse dimension of said upper portion, and said lower portion of the hopper having its sides inclined to the vertical at an angle of not more than 15°, a first series of ducts in said vertical walls, outlet holes adjacent the upper edges of said walls and connected to said first series of ducts, a second series of ducts in said vertical walls, outlet holes adjacent the lower edges of said walls and connected to said second series of ducts, means for supplying a gaseous medium to both said series of ducts so as to produce a total upward current of gaseous medium sufficient to maintain the fluidized bed above the vertical walls and a lesser upward current of gaseous medium between the walls insufficient to produce fluidization of solid material between said walls, and means for controlling downward movement of solid material in said hopper whereby the gaseous medium and solid material move in countercurrent between said vertical walls and heat exchange takes place between them.

References Cited in the file of this patent

UNITED STATES PATENTS

| | | |
|---|---|---|
| 2,563,086 | Verschoor | Aug. 7, 1951 |
| 2,620,313 | Odell | Dec. 2, 1952 |
| 2,621,118 | Cyn et al. | Dec. 9, 1952 |
| 2,638,414 | Lewis | May 12, 1953 |
| 2,650,084 | White | Aug. 25, 1953 |